Figure 6:
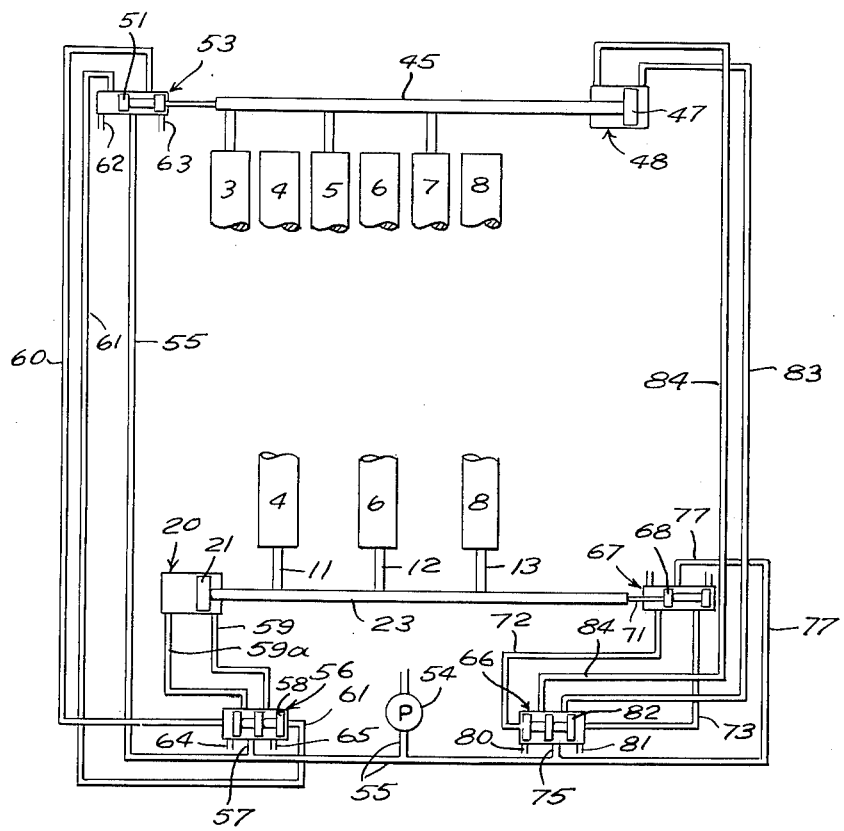

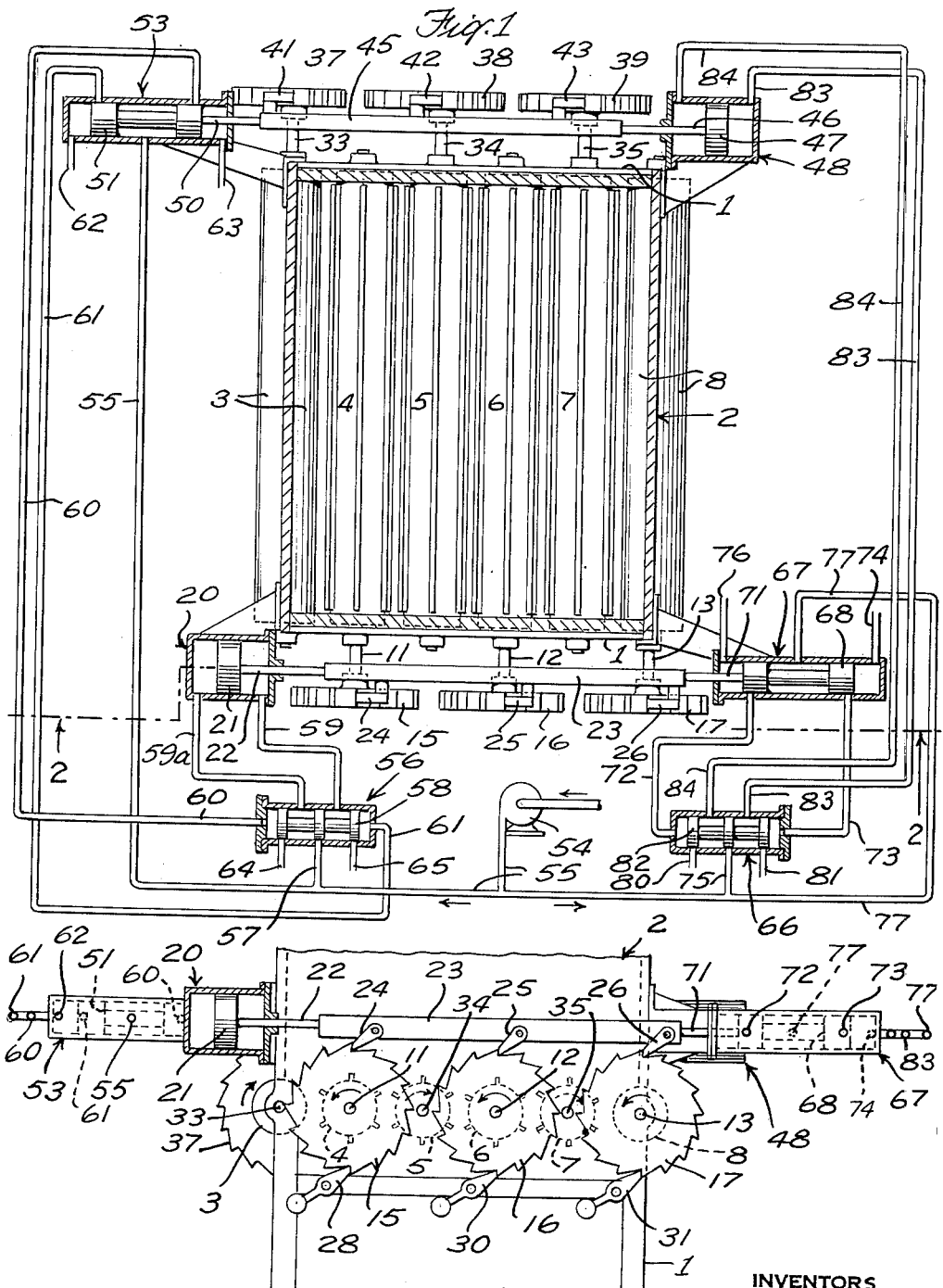

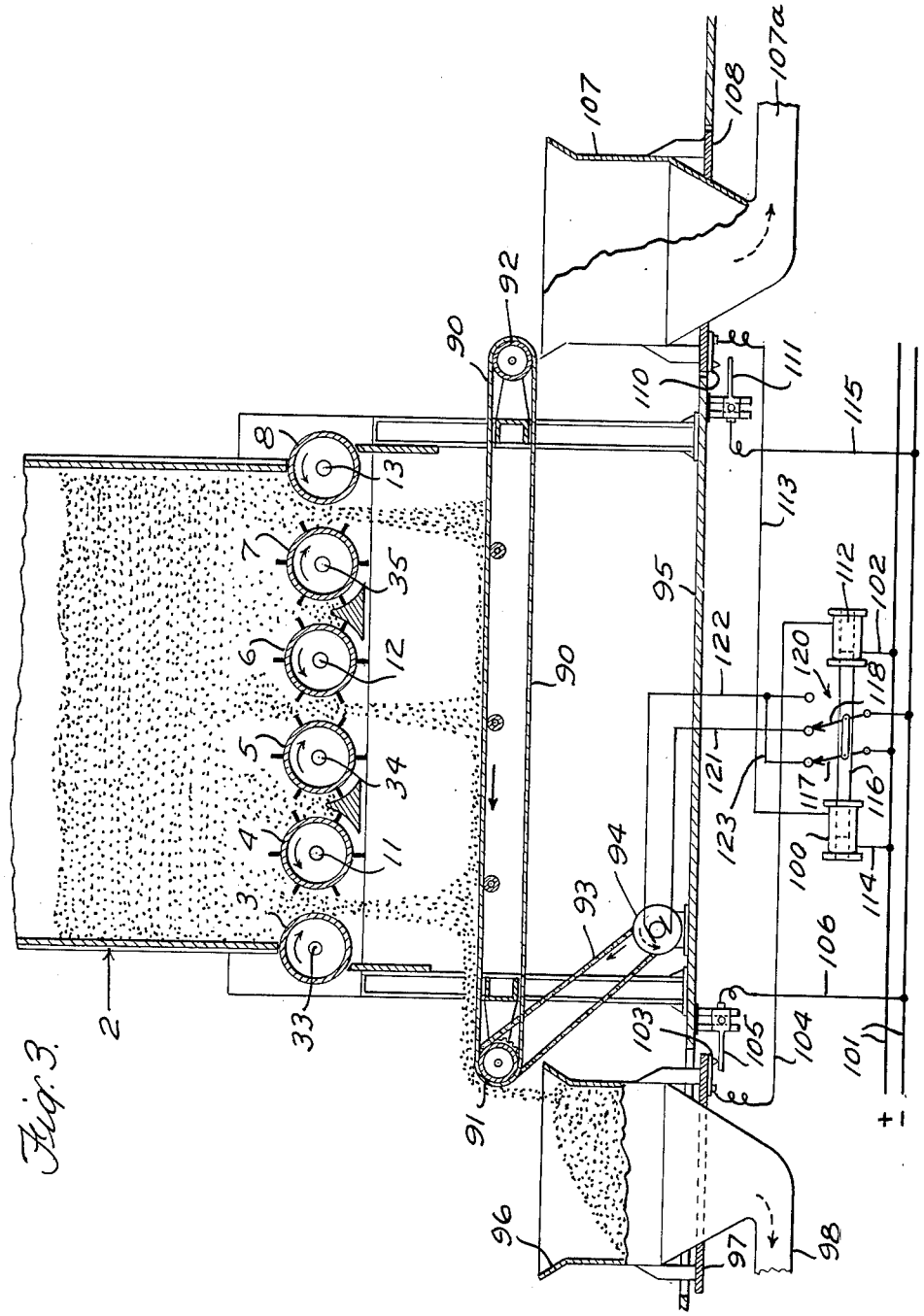

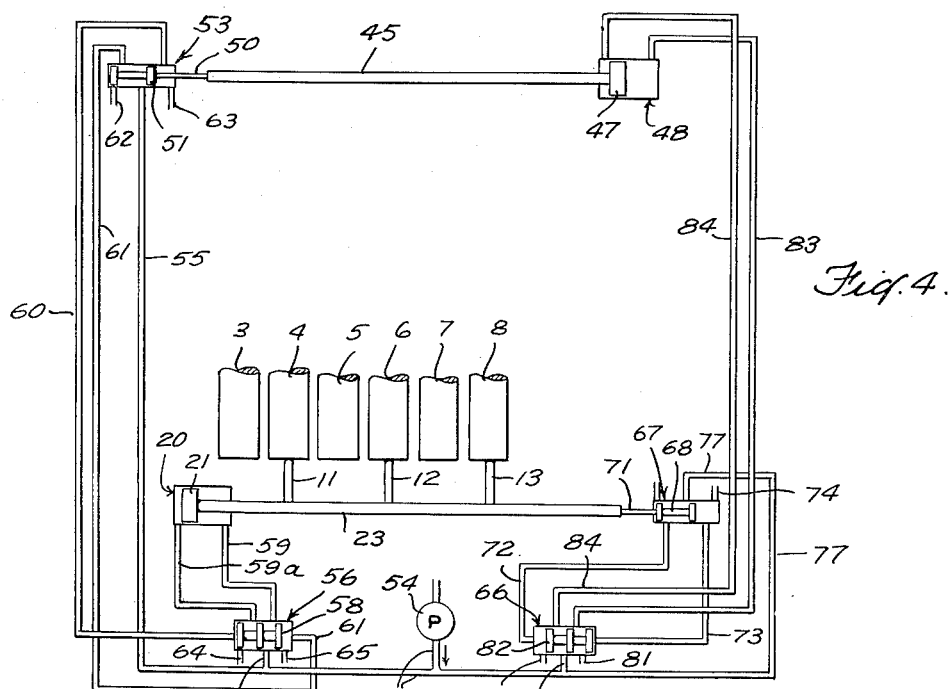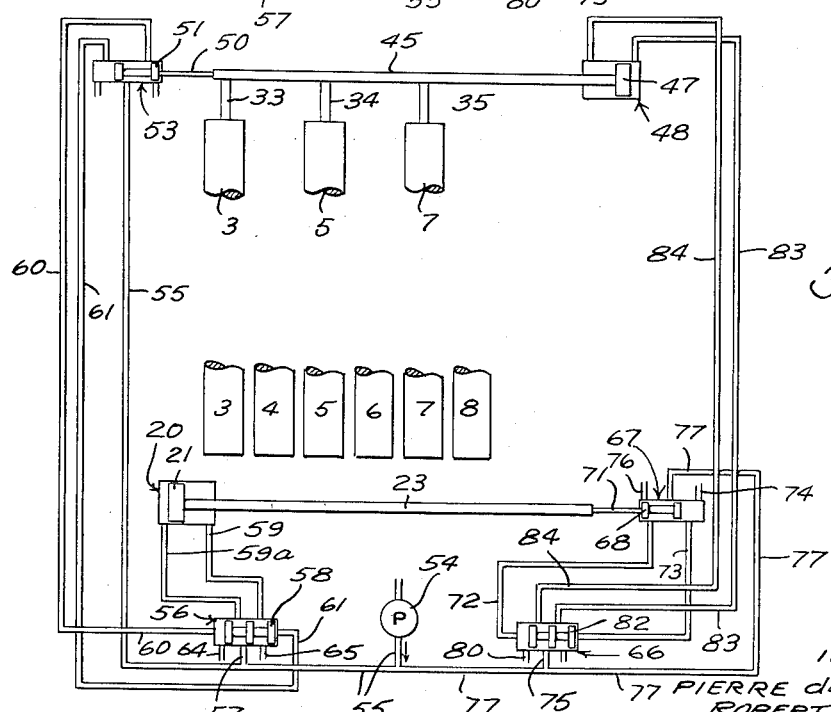

Oct. 2, 1962 P. DE HALLEUX ET AL 3,056,484
DISCHARGE MECHANISM FOR STATIONARY TOWERS
Filed May 11, 1959 4 Sheets-Sheet 4

INVENTORS
PIERRE de HALLEUX
ROBERT P. KING

BY Borst & Borst
ATTORNEYS

United States Patent Office 3,056,484
Patented Oct. 2, 1962

3,056,484
DISCHARGE MECHANISM FOR STATIONARY TOWERS
Pierre de Halleux, Brussels, Belgium, and Robert P. King, Ashfield, Mass.; said de Halleux assignor, by mesne assignments, to said King, New York, N.Y.
Filed May 11, 1959, Ser. No. 812,366
2 Claims. (Cl. 198—127)

This invention relates to discharge mechanisms for stationary towers which are employed in the viscose process to age alkali cellulose.

In the manufacture of viscose the continuous aging tower is designed to contain large quantities of the cellulosic material which has been previously steeped in caustic soda and reduced to crumb form. This material places a heavy load on the mechanism which is disposed at the bottom of the tower for the purpose of discharging the material therefrom. Such mechanism typically includes bladed rollers which serve to actively pass the material through the bottom of the tower. The energy required to drive the rollers in rotation is, of course, partially dependent on the weight externally exerted against them by the material. It has been found in practice that in order to move the rollers through the mass of material, which may amount to thirty tons or more, large capacity hydraulic pumps and engines have had to be employed and it has therefore been proposed that two or more hydraulic cylinders disposed in the same hydraulic system be utilized to drive separate groups of rollers in phase. Under these conditions, the capacity of the cylinders can be considerably reduced since they are required to perform no more than half the work of a single cylinder driving all the rollers. However, since all the rollers are driven in phase, the capacity of the hydraulic pump, motor and the other components in the system msut be sufficiently large to be capable of delivering the required amount of power simultaneously to the several cylinders. The same disadvantage inheres in other systems which involve the driving of alternate rollers by friction or gearing from positively driven rollers. The discharge system contemplated by this invention provides separate engine drive for several groups of discharge rollers in order to reduce the load on individual engines. Additionally, it provides means for positively driving each roller, and is so arranged that the groups of rollers are driven in separate phase relation, thus permitting a general reduction in the size and capacity of the entire system without unduly impairing its capacity to extract the material from the tower.

The invention also contemplates an improved conveyor system which is capable of being continuously operated to carry away the material which is continuously fed to it by the discharge rollers.

One object of the invention is to provide an improved hydraulic drive system for a continuous, alkali cellulose aging tower which is economical to build and operates with higher degree of efficiency than systems in present use.

Another object of the invention is to provide an improved discharge mechanism for a continuous aging tower which includes a hydraulic drive system for the rollers and a conveyor system adapted to be driven continuously in conjunction therewith.

Other objects and advantages of the invention may be perceived on reading the following detailed description of one embodiment thereof which is taken in conjunction with the accompanying drawing in which FIG. 1 is a plan section illustrating the hydraulic drive system for a continuous aging tower, FIG. 2 is a side elevation in partial section taken on the line 2—2 of FIG. 1, FIG. 3 is a longitudinal section showing the conveyor system underneath the tower, and FIG. 4 is an operative diagram illustrating a hydraulic system for driving two sets of rollers in separate phase relation with the lower bar drive for one set and its connected piston and valve positioned at the end of their working stroke and the upper bar for the other set and its connected piston and valve positioned at the end of their return stroke, FIG. 5 is an operative diagram illustrating a hydraulic system for driving two sets of rollers in separate phase relation with the upper bar positioned at the end of its working stroke and the lower bar positioned as shown in FIG. 4 prior to its return stroke, and FIG. 6 is an operative diagram illustrating a hydraulic system for driving two sets of rollers in separate phase relation with the lower bar positioned at the end of its return stroke and the upper bar shown in the position to which it is driven on its work stroke prior to its being returned to the position shown in FIG. 4.

Referring to FIG. 1 a frame 1 is attached at the base of a stationary, continuous alkali cellulose aging tower partially indicated in FIG. 2 and assigned reference numeral 2 in that FIGURE. A plurality of delivery rollers 3, 4, 5, 6, 7 and 8 are rotatably supported in the frame in axial parallelism. The rollers 4, 6 and 8 have axial extensions 11, 12 and 13, respectively. Ratchet wheels 15, 16 and 17 are mounted on the ends of the extensions 11, 12 and 13, respectively. There is disposed over the ratchet wheels a cylinder 20 having a piston 21 therein to which there is attached a piston rod 22 having an extension bar 23. Pawls 24, 25 and 26 are pivotally supported by the bar 23, and are normally disposed in tooth engagement with the ratchet wheels 15, 16 and 17, respectively. In addition, there is provided below the ratchet wheels holding pawls 28, 30 and 31 which oppose the pawls mentioned above and are in normal tooth engagement with the ratchet wheels 15, 16 and 17, respectively. Similarly, the rollers 3, 5 and 7 have axial extensions 33, 34 and 35. Ratchet wheels 37, 38 and 39 are mounted on the ends of the extensions 33, 34 and 35, respectively, and are normally engaged by pawls 41, 42 and 43, respectively, which are pivotably carried by a bar 45 which is an extension of piston rod 46 of the piston 47 disposed in the cylinder 48. To the other end of the bar 45 is connected a valve rod 50, the end of which supports twin slide valves 51 disposed in valve control unit 53. The valve control unit 53 communicates with hydraulic pump 54 by means of pipe 55, the pump 54 being arranged to draw in hydraulic fluid from a reservoir not shown. The pipe 55 also communicates with the interior of piston control unit 56 through stub pipe 57. A three-piece slide valve 58 is disposed in the piston control unit 56 being adapted to be displaced in accordance with the action of the valve control unit 53 by virtue of its being end connected thereto by pipes 60 and 61 leading from the unit 53. The interior of the piston control unit 56 communicates with the cylinder 20 on each side thereof by means of pipes 59 and 59a. Reservoir discharge pipes 62 and 63 are provided for the valve control unit 53 and reservoir discharge pipes 64 and 65 are provided for the piston control unit 56.

Similarly, the cylinder 48 is controlled by a piston control unit 66 which in turn is operated by a valve control unit 67 in a manner which is identical to the control of the cylinder 20. Accordingly, the valve control unit 67 has twin slide valves 68 which are displaced by the piston actuated bar 23, a valve rod 71 connecting the slide valves to the bar 23. Pipes 72 and 73 provide communication between the valve control unit 67 and the two respective ends of the piston control unit 66 and the valve control unit 67 is connected to the hydraulic pump 54 by means of pipe 77 which also communicates with the piston control unit 66 through stub pipe 75. Each end of the valve control unit 67 is provided with reservoir discharge pipes 74 and 76 and reservoir discharge pipes 80 and 81 are designed to connect the piston control unit 66 to the reservoir (not shown). The cylinder 48 is operated in accordance with the position of the three-piece slide valve 82 within the piston control unit 66 as determined in turn by the valve control unit 67, there being provided a pipe 83 which connects the cylinder 48 on one side thereof to the piston control unit 66 and a pipe 84 connecting the cylinder 48 on the other side thereof to the unit 66.

The hydraulic drive system operates to drive the rollers 4, 6 and 8 in a counter-clockwise direction on a given stroke of the bar 23 while the rollers 3, 5 and 7 are operated in a clockwise direction on a succeeding stroke of the bar 45 in the following manner.

To describe the operation of the system it will be first assumed the bar 45 has completed its return stroke and is, therefore, in its extreme left position as shown in FIG. 4. This position of the bar 45 causes the bar 23 to start its working stroke to the left which causes the ratchet wheels 15—17 to be driven through the pawls 24—26, respectively, in a counter-clockwise direction. This is because oil pressure is exerted on the right face of the piston 21 which is due to the fact that the sliding valve 58 in the piston control unit 56 has been displaced to its extreme left hand position as a consequence of the position of the slide valves 51 in the valve control unit 53. This position of the slide valves 51 causes the right hand end of the piston control unit 56 to be in communication with the pump 54 through the pipe 55, the piston control unit 53 and the pipe 61 causing the bar 23 to be driven as a working stroke to the left, the oil to the left of the piston 21 being moved out of the cylinder 20 through pipe 59a, the piston control unit 56 and the discharge pipe to the reservoir (not shown).

At the completion of the working stroke to the left for the bar 23, the bar 45 is caused to begin its working stroke to the right. This is initially due to the fact that the sliding valve 82 in the piston control unit 66 is in its extreme right hand position which is so positioned because the left hand end of the piston control unit 66 is in communication with the pump 54 through the pipe 77, the valve control unit 67 and the pipe 72. Accordingly, pressure is exerted on the left face of the sliding valve 82 so as to move it to its extreme right hand position as shown in FIG. 5. In this position pressure is exerted on the left face of the piston 47 in the cylinder 48 since the left end of the latter is in communication with the pump 54 through the pipe 77, the piston control unit 66 and the pipe 84. As the bar 45 is driven to the right on its working stroke, oil located to the right of the piston 47 in the cylinder 48 is pushed out of the cylinder through pipe 83 and the piston control unit 66 and returned to the reservoir (not shown) through the discharge pipe 81.

Because of the new position of the slide valves 51, the bar 23 is caused to begin its return stroke to the right. This is due to the fact that slide valve 58 has been moved to the right, as shown in FIG. 5, and, as a consequence, the left hand side of the cylinder 20 is placed in communication with the pump through pipes 55 and 57, the piston control unit 56 and the pipe 59a.

With the bar 23 returned to its operative position, as shown in FIG. 6, the bar 45 is caused to return to its operative position. This is because the right hand side of the cylinder 48 is open to the pump through the pipe 77, the piston control unit 66 and the pipe 83. Accordingly, the bar 45 is returned to the position shown in FIG. 4 so that the bar 23 can start its workstroke to the left the completion of which is also shown in FIG. 4.

When the bar 45, moved by the piston 47, arrives at the end of its movement to the right as shown in FIG. 5 to complete its working stroke, it moves the sliding valve 51 to its extreme right by means of the valve rod 50 as shown in FIG. 5. Consequently the oil, coming from the pump 54 through pipe 55, is driven through the valve control unit 53, pipe 60 and acts upon the left face of the sliding valve 58, which is moved to its extreme right position as shown in FIG. 5. The oil coming through the pipe 60 runs into the reservoir by the pipe 64. In consequence of the new position of the sliding valve 58, the oil pressure created in the pipe 55, pipe 57, the piston control unit 56 and the pipe 59a, acts upon the left-hand face of the piston 21 in the cylinder 20 thus causing the bar 23 to move to the right as shown in FIG. 6 to return it to its initial operating position preparatory to its working stroke. The oil contained in the cylinder 20 on the other side of the piston 21 is caused to flow into the reservoir through the pipe 59, the piston control unit 56, and the pipe 65. During this return stroke of the bar 23 the ratchet wheels are prevented from turning in the reverse direction at the end by the pawls 28—31.

During this return movement of the piston 21 the bar 45 remains stationary in its extreme right position as shown in FIG. 6. Arriving at the end of its return stroke, the bar 23 moves the sliding valve 68 to the extreme right by means of the valve rod 71 as shown in FIG. 6. Owing to the new position of the sliding valve 68, oil coming from the pump 54 through the pipe 77, valve control unit 67 and pipe 73 presses upon the right-hand face of the sliding valve 82 which is thus moved towards the left as shown in FIG. 6. Consequently the oil is pumped from the pump 54 through the piston control unit 66 and the pipe 83 and is impressed on the right-hand face of the piston 47. The oil contained in the cylinder 48 on the other side of the piston 47 returns to the reservoir through the pipes 84, the piston control unit 66 and the pipe 80. The bar 45 then begins its return stroke with the pawls 41—43 engaging the ratchet wheels which are thus prevented from turning by holding pawls, not shown. At the end of this stroke the bar moves the sliding valve 51 to the left as shown in FIG. 4 and then stops. Thus the cycle of operations has been completed. This cycle therefore comprises three phases: rotation in one direction of the rollers 3, 5 and 7 during the first phase; rotation in the opposite direction of the rollers 4, 6 and 8 during the second phase; and then holding the two sets of rollers for a time during which the drive mechanisms for the two sets of rollers are returned in sequence to their initial working positions.

Immediately below the discharge section of the tower 2 is disposed a reversible belt 90 mounted on drums 91 and 92 and driven through chain 93 by reversible motor 94 mounted on the base 95 which supports the continuous aging tower.

There is provided below the roller 91 a batch receptacle 96 mounted on weighing platform 97 and adapted to communicate with a conveyor 98, which is here shown as a conduit through which accumulated material may be carried away to a location where the next step in the process is performed. Solenoid 100 may be placed across line 101 which is provided to energize the motor 94. To this end, the solenoid 100 is connected to one side of the lead line 102 and to a contact 103 on the weighing platform 97 by means of conductor 104. When the batch receptacle 96 is sufficiently weighted by accumulated material, the contact 103 engages a vertically adjustable bar 105 which is dependent from the base 95 and connected to the other side of the line by lead 106.

Similarly, at the other end of the reversible conveyor belt 90, there is disposed under the drum 92 a batch receptacle 107 having a conveyor 107a and supported by weighing platform 108 and having an electrical contact 110 attached to its surface. The contact 110 is adapted to engage horizontal bar 111 when the batch receptacle 107 contains sufficient accumulated material. Solenoid 112 is connected across the line 101 when the contact 110 engages the bar 111, the former being connected to one side of the line through the solenoid 112 by means of connection 113 and lead 114 and the latter being connected to the other side of the line by means of connection 115. There is provided a bar armature 116 which is adapted to enter the core of either solenoid and has mounted thereon a switch arm 117 permanently connected to one side of the line 101 and a second switch arm 118 permanently connected to the other side of the line 101. The arms 117 and 118 are adapted to contact selectively two poles of a conventional three-pole switch 120 depending on the position of the bar armature 116. A lead 121 and lead 122 connects the switch across the motor 94. The lead 122 is connected to a third pole of the three-pole switch by means of lead 123 which together with leads 121 and 122 also connects the motor 94 across the switch 120. The switch arm 117 is so disposed on the armature 116 as to be adapted to contact the poles connected to the leads 121 and 123 while the arm 118 is adapted to engage the poles connected to the leads 121 and 122. Accordingly, the motor leads are adapted to be connected across the line with a selective polarity.

In operation, the ripened material is discharged through the rollers on to the conveyor belt 90 which is traveling, for example, from right to left and conveying the material to the batch receptacle 96. The bar armature 116 is in the position shown in FIG. 3. When sufficient material is accumulated in the receptacle 96 the weighing platform 97 descends and the contact 103 and bar 105 engage. Solenoid 112 is energized and the armature 116 is drawn from left to right into the interior of the solenoid core and reverses the direction of the motor and hence the conveyor belt 90. When the receptacle 96 begins to empty the connection of the solenoid 112 across the line is broken.

When the receptacle 107 is filled with material the contact 110 and bar 111 engage so that the solenoid 100 is placed across the line, draws the armature back to the position shown in FIG. 3 and again reverses the motor 94 and delivery belt 99.

Various modifications in the hydraulic drive system above described may be effected by persons skilled in the art without departing from the principle and scope of the invention as defined in the following claims.

What is claimed is:

1. A hydraulic drive system for a continuous aging tower comprising a first set of rotatable delivery rollers, a second set of rotatable delivery rollers, a first drive mechanism connected to drive said first set of delivery rollers, a second drive mechanism connected to drive said second set of delivery rollers, a hydraulically actuated system connected to drive said first drive mechanism when said second drive mechanism is stationary, a second hydraulically actuated system connected to drive said second drive mechanism when said first drive mechanism is stationary, each of said hydraulically actuated systems being responsive to and controlled by the position of the drive mechanism which is actuated by the other system.

2. A hydraulic drive system as defined in claim 1 wherein each of said hydraulically actuated systems includes an hydraulic fluid supply pipe, a valve control unit connected to said pipe, a piston control unit connected to said pipe and a cylinder having a drive mechanism connecting piston disposed therein, a pair of hydraulic connections between said piston control unit and said cylinder, and a pair of hydraulic connections between the valve control unit and said piston control unit.

References Cited in the file of this patent

UNITED STATES PATENTS

| | | |
|---|---|---|
| 1,515,181 | Toomey | Nov. 11, 1924 |
| 1,856,884 | Popov | May 3, 1932 |
| 2,307,008 | Bostick | Jan. 5, 1943 |
| 2,676,694 | Wyss et al. | Apr. 27, 1954 |
| 2,758,569 | Peterson | Aug. 14, 1956 |
| 2,840,276 | Dreyer et al. | June 24, 1958 |
| 2,947,187 | Graff | Aug. 2, 1960 |